(12) United States Patent
Watanabe et al.

(10) Patent No.: US 9,151,310 B2
(45) Date of Patent: Oct. 6, 2015

(54) STRUCTURE OF MOUNTING GROMMET

(71) Applicant: Yazaki Corporation, Minato-ku, Tokyo (JP)

(72) Inventors: Jin Watanabe, Toyota (JP); Satoshi Ohmae, Toyota (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/334,795

(22) Filed: Jul. 18, 2014

(65) Prior Publication Data

US 2014/0325790 A1    Nov. 6, 2014

Related U.S. Application Data

(63) Continuation of application No. PCT/JP2013/000219, filed on Jan. 18, 2013.

(30) Foreign Application Priority Data

Jan. 23, 2012   (JP) ................ 2012-011161

(51) Int. Cl.
   *F16B 13/00*   (2006.01)
   *B60R 16/02*   (2006.01)

(52) U.S. Cl.
   CPC ............. *F16B 13/00* (2013.01); *B60R 16/0222* (2013.01); *Y10T 16/05* (2015.01)

(58) Field of Classification Search
   CPC .... Y10T 16/05; Y10T 16/063; H01B 17/583; H02G 3/22; H02G 3/083; B60R 16/0222; F16L 5/00; F16B 13/00
   USPC ............. 16/2.1, 2.2; 174/152 G, 153 G, 650; 248/56; 277/606
   See application file for complete search history.

(56) References Cited

U.S. PATENT DOCUMENTS

| | | | |
|---|---|---|---|
| 4,861,282 A | 8/1989 | Kobayashi et al. | |
| 5,531,459 A * | 7/1996 | Fukuda et al. | ............. 277/606 |
| 6,685,195 B2 * | 2/2004 | Uchida et al. | ............. 277/628 |
| 6,897,380 B2 * | 5/2005 | Sakata et al. | ............. 174/650 |
| 2008/0017401 A1 | 1/2008 | Uchida et al. | |
| 2013/0061424 A1 | 3/2013 | Lee | |

FOREIGN PATENT DOCUMENTS

| | | |
|---|---|---|
| JP | 10-243533 A | 9/1998 |
| JP | 11-155222 A | 6/1999 |
| WO | 2012/002587 A1 | 1/2012 |

OTHER PUBLICATIONS

International Search Report of PCT/JP2013/000219 dated Apr. 11, 2013.

* cited by examiner

*Primary Examiner* — William Miller
(74) *Attorney, Agent, or Firm* — Sughrue Mion, PLLC

(57) ABSTRACT

A structure of mounting a grommet according to one embodiment includes: the grommet with: a cylindrical portion for covering a wire harness inserted into a panel hole formed at a panel; and a cylindrical portion provided at an end portion of the cylindrical portion and adhered tightly to the panel in such a manner as to cover an edge portion of the panel hole. When the grommet is mounted to the panel, the cylindrical portion is disposed on a room inside, and the wire harness and the cylindrical portion are upwardly inclined.

9 Claims, 4 Drawing Sheets

STRUCTURE OF MOUNTING GROMMET

CROSS REFERENCE TO RELATED APPLICATIONS

This application is a continuation application of International Application No. PCT/JP2013/000219, filed on Jan. 18, 2013 which claims priority to Japanese Patent Application No. 2012-011161, filed on Jan. 23, 2012, the entire contents of which are incorporated by references herein.

BACKGROUND OF THE INVENTION

1. Field of the Invention

The present invention relates to a structure of mounting grommet, in particular, relates to a structure of mounting a grommet fitted to a panel provided at an automobile and the like.

2. Description of the Related Art

Conventionally, when inserting a wire harness including a plurality of electric wires to a panel (mounted body) serving as a partition between a room outside, on an engine room side, and a room inside in a vehicle such as an automobile, the wire harness is inserted via a grommet into a panel hole (opening portion) formed at the panel, to thereby maintain sealability (water-proof) between the room outside and the room inside.

In general, the grommet of this type is provided with: a small diameter cylindrical portion covering the plurality of wire harnesses bonded by a tape; and a large diameter cylindrical portion provided at a distal end of the small diameter cylindrical portion and adhered tightly to the panel in such a manner as to cover an edge portion of the panel hole. Further, a part of the plurality of wire harnesses bonded by the tape is tightened with a tightening metal fitting together with the small diameter cylindrical portion, thus filling a liquid-solidifying water-stopper agent between a group of electric wires of the wire harnesses in the small diameter cylindrical portion (for example, refer to Japanese Unexamined Patent Application Publication No. 10-243533). The above filling of the liquid-solidifying water-stopper agent makes it difficult for the water content to enter into the grommet, thus enabling to reliably improve sealability.

SUMMARY OF THE INVENTION

However, with the conventional grommet set forth above, it is necessary to fill the water stopper agent in the small diameter cylindrical portion so as to improve the sealability. Since the work for filling the water stopper agent is complicated, it is difficult to improve productivity of the vehicle. As a result, the production cost is increased.

It is an object of the present invention to provide a structure of mounting grommet capable of improving sealability while reducing the production cost.

According to one aspect of the present invention, there is provided a structure of mounting a grommet, including: the grommet with: a first cylindrical portion for covering at least one wire harness inserted into an open portion of a mounted body serving as a partition between a room outside and a room inside; and a second cylindrical portion provided at an end portion of the first cylindrical portion and adhered tightly to the mounted body so as to cover an edge portion of the open portion, wherein when the grommet is mounted to the mounted body, the first cylindrical portion is arranged on the room inside and the wire harness and the first cylindrical portion are inclined in an upward direction.

A plurality of the wire harnesses may be provided instead of at least one wire harness. The plurality of the wire harnesses may be put in a non-bonded state at least in the grommet.

An angle between an imaginary line connecting a center of the second cylindrical portion contacting the mounted portion to a center of a distal end of the first cylindrical portion and a horizontal line may be from 15 degrees to 65 degrees.

The present invention can provide a structure of mounting grommet capable of improving sealability while reducing the production cost.

DESCRIPTION OF THE PREFERRED EMBODIMENTS

Figure 1:
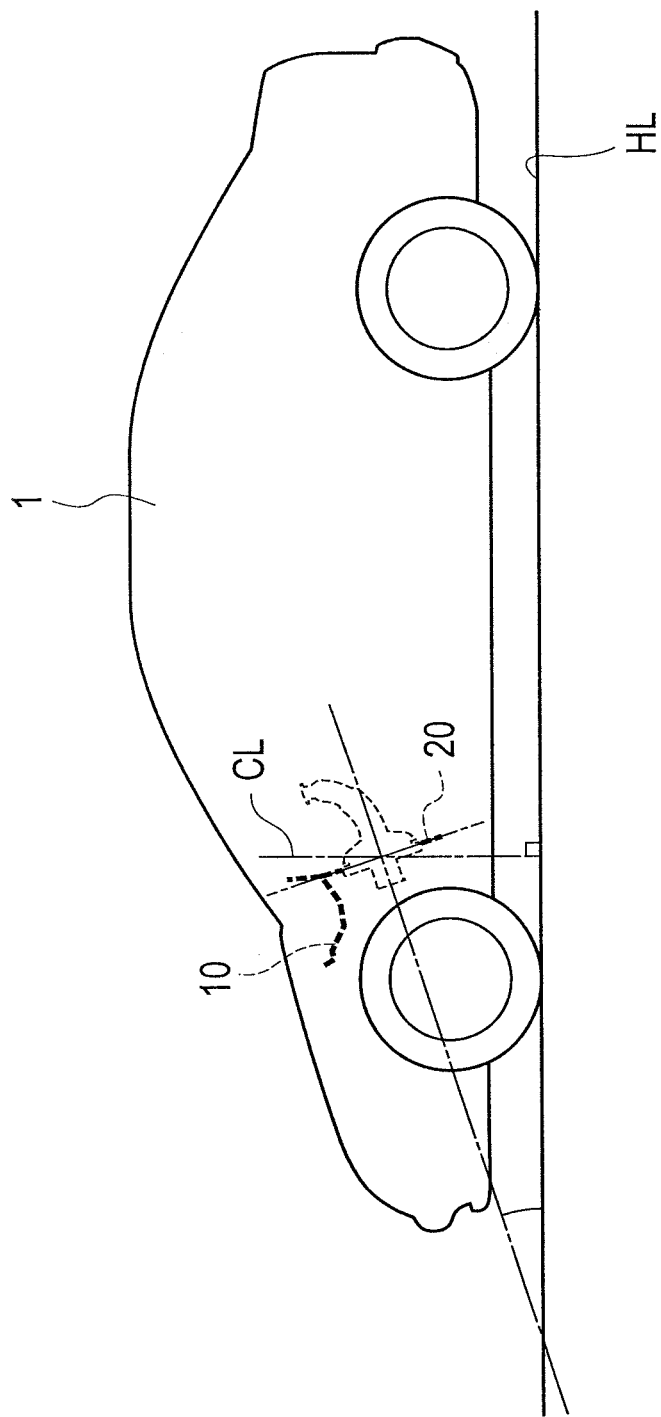
FIG. 1 is a schematic view showing a vehicle 1 to which a grommet 100 according to an embodiment is fitted.

Next, an embodiment of a structure of mounting grommet according to the present invention will be set forth with reference to drawings. Specifically, (1) a schematic structure of a vehicle, (2) a structure of a grommet, (3) a structure of mounting grommet, (4) evaluation results, (5) operations and effects, and (6) other embodiments will be explained.

Further, in the description of the following drawings, the same or similar reference numerals or signs will be affixed to the same or similar portions. However, the drawings are schematic and, therefore, it should be noted that the ratio and the like of each dimension are different from those of actual ones.

Thus, specific dimensions and the like should be determined, referring to the following explanations. Further, the drawings may also include portions different from each other in dimensional relations or different dimensional ratios.

(1) Schematic Structure of Vehicle

Figure 2:
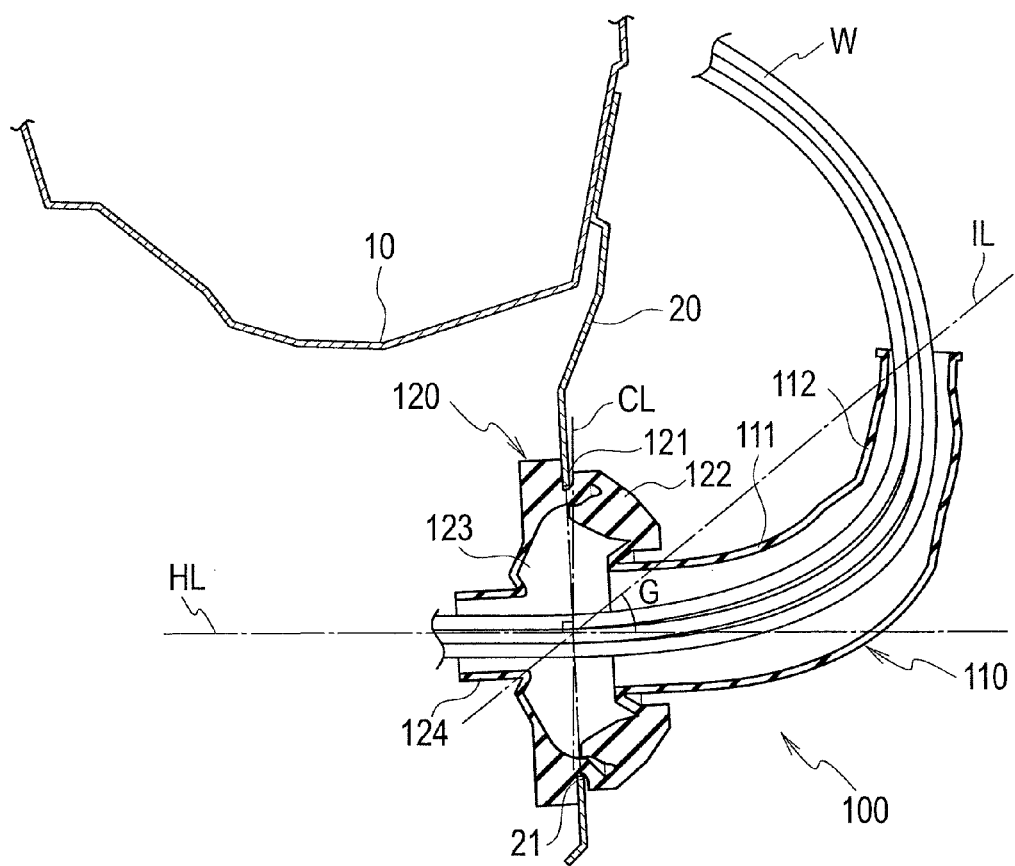
FIG. 2 is a cross sectional view showing a state in which the grommet 100 according to the embodiment is mounted to the vehicle 1.

First, the schematic structure of a vehicle 1 to which a grommet 100 according to the embodiment is fitted will be explained with reference to drawings. FIG. 1 is a schematic view showing the vehicle 1 to which the grommet 100 according to the embodiment is fitted. FIG. 2 is a cross sectional view showing a state in which the grommet 100 according to the embodiment is mounted to the vehicle 1.

As shown in FIG. 1 and FIG. 2, in the vehicle 1, a panel 20 (mounted body) extending downwardly from a cowl panel 10 partitions a room outside on an engine room side from a room inside. That is to say, the panel 20 serves as a partition, in the vehicle 1, between the room outside on the engine room side and the room inside. The panel 20 is formed with a panel hole 21 (refer to FIG. 2) passing through the panel 20. A plurality of wire harnesses W including a plurality of electric wires (not shown) are inserted through the panel hole 21 via the grommet 100.

As shown in FIG. 2, the plurality of wire harnesses W are in a non-bonded state at least in the grommet 100 and are independent of each other. Further, it suffices for the plurality of wire harnesses W to be in the non-bonded state in the grommet 100. For example, the plurality of wire harnesses W may be bonded by a tape, a tightening metal fitting or the like outside the grommet 100.

Herein, according to the embodiment, the panel 20 is provided in a state of being inclined relative to a cross line CL orthogonal to a horizontal line HL (refer to FIG. 1).

(2) Structure of Grommet

Figure 3A:
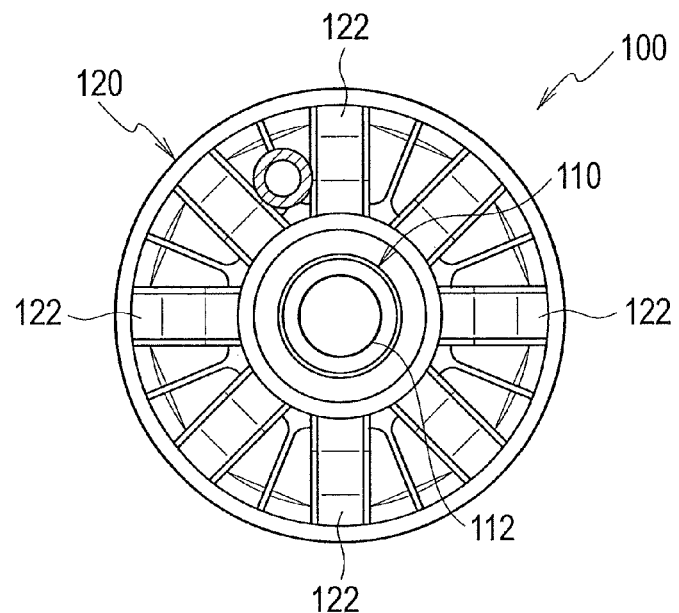
FIG. 3A is a front view showing the grommet 100 according to the embodiment.
Figure 3B:
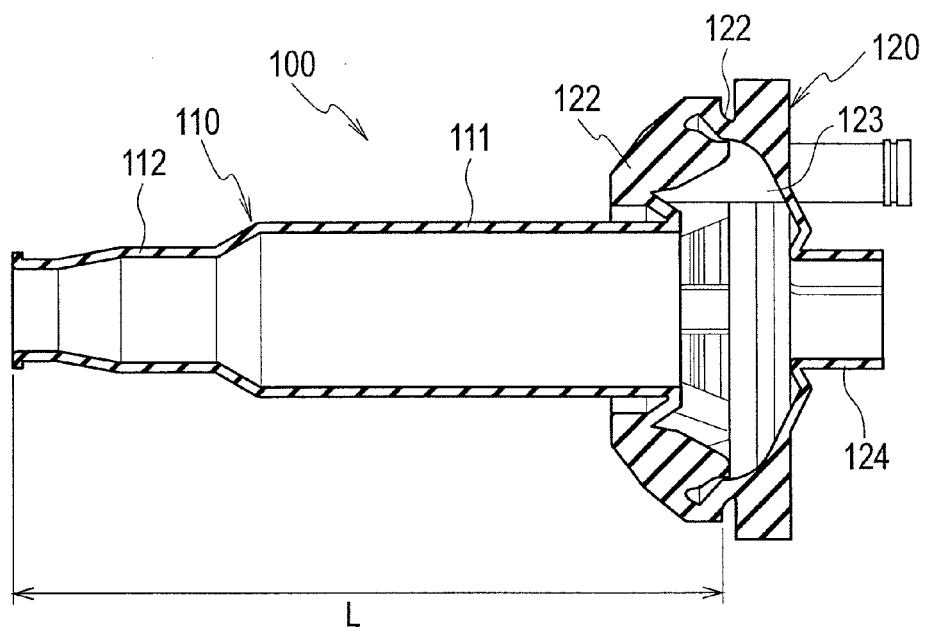
FIG. 3B is a cross sectional view in the longitudinal direction showing the grommet 100 according to the embodiment.

Next, structure of the above grommet 100 will be explained with reference to FIGS. 2, 3A and 3B. FIG. 3A is a front view showing the grommet 100 according to the embodiment, and FIG. 3B is a cross sectional view in the longitudinal direction showing the grommet 100 according to the embodiment.

As shown in FIG. 2 and FIG. 3, the grommet 100 is made of an elastically deformable material such as rubber. The grommet 100 is provided with a cylindrical portion (first cylindrical portion) 110 covering the wire harness W inserted through the panel hole 21 and a cylindrical portion (second cylindrical portion) 120 provided at an edge portion of the cylindrical portion 110 and adhered tightly to the panel 20 in such a manner as to cover an edge portion of the panel hole 21.

The cylindrical portion 110 is arranged on the side of the room inside. The cylindrical portion 110 has a diameter smaller than a diameter of the cylindrical portion 120, and is formed in a form of a long tube. The cylindrical portion 110 includes a long body portion 111 connected to the cylindrical portion 120 and a distal end portion 112 connected to the body portion 111 and smaller in diameter than the body portion 111.

The cylindrical portion 120 is formed integrally with the cylindrical portion 110 and is mounted to the panel 20. Outside the cylindrical portion 120, there is formed a mating groove 121 to be mated with the panel hole 21. On the cylindrical portion 110 side of the mating groove 121, there are provided a plurality of elastic piece portions 122 which are elastically deformable. The elastic piece portion 122 is so made that when the grommet 100 is mounted to the panel 20, the elastic piece portion 122 is deflected into a space 123 provided inside the cylindrical portion 120. Further, on the side opposite to the cylindrical portion 110 in the cylindrical portion 120, there is provided a cover portion 124 for covering an outer periphery of the wire harness W.

Herein, the length (hereinafter, referred to as grommet length L) from the mating groove 121 to a distal end of the cylindrical portion 110 (distal end portion 112) can be properly set, for example, at 100 mm to 150 mm.

(3) Structure of Mounting Grommet

Next, the structure of mounting the grommet 100 to the panel 20 set forth above will be explained with reference to FIG. 1 and FIG. 2.

As shown in FIG. 1 and FIG. 2, in the sequence of the distal end portion 112 and body portion 111, the grommet 100 with the wire harness W inserted is inserted into the panel hole 21. Then, the elastic piece portion 122 contacts the edge portion of the panel hole 21 and is deflected into the space 123 provided inside the cylindrical portion 120. Then, when the mating groove 121 is mated with the panel hole 21, the elastic piece portion 122 is restored to thereby adhere the cylindrical portion 120 tightly to the panel 20, thus mounting the grommet 100 to the panel 20.

When the grommet 100 is mounted to the panel 20, the cylindrical portion 110 is arranged on the side of the room inside, and the wire harness W and the cylindrical portion 110 are inclined in the upward direction of the vehicle 1. Specifically, as shown in FIG. 2, it is preferable that an angle (hereinafter referred to as grommet angle G) between an imaginary line IL connecting the center of the cylindrical portion 120 contacting the panel 20 to the center of the distal end of the cylindrical portion 110 (the end edge of the distal end portion 112) and a horizontal line HL be from 15 degrees to 65 degrees. Further, according to the embodiment, since the panel 20 is so provided as to be inclined relative to the horizontal line HL, the panel 20 is inclined relative to the cylindrical portion 120 in addition to the wire harness W and the cylindrical portion 110.

(4) Comparative Evaluations

Figure 4:
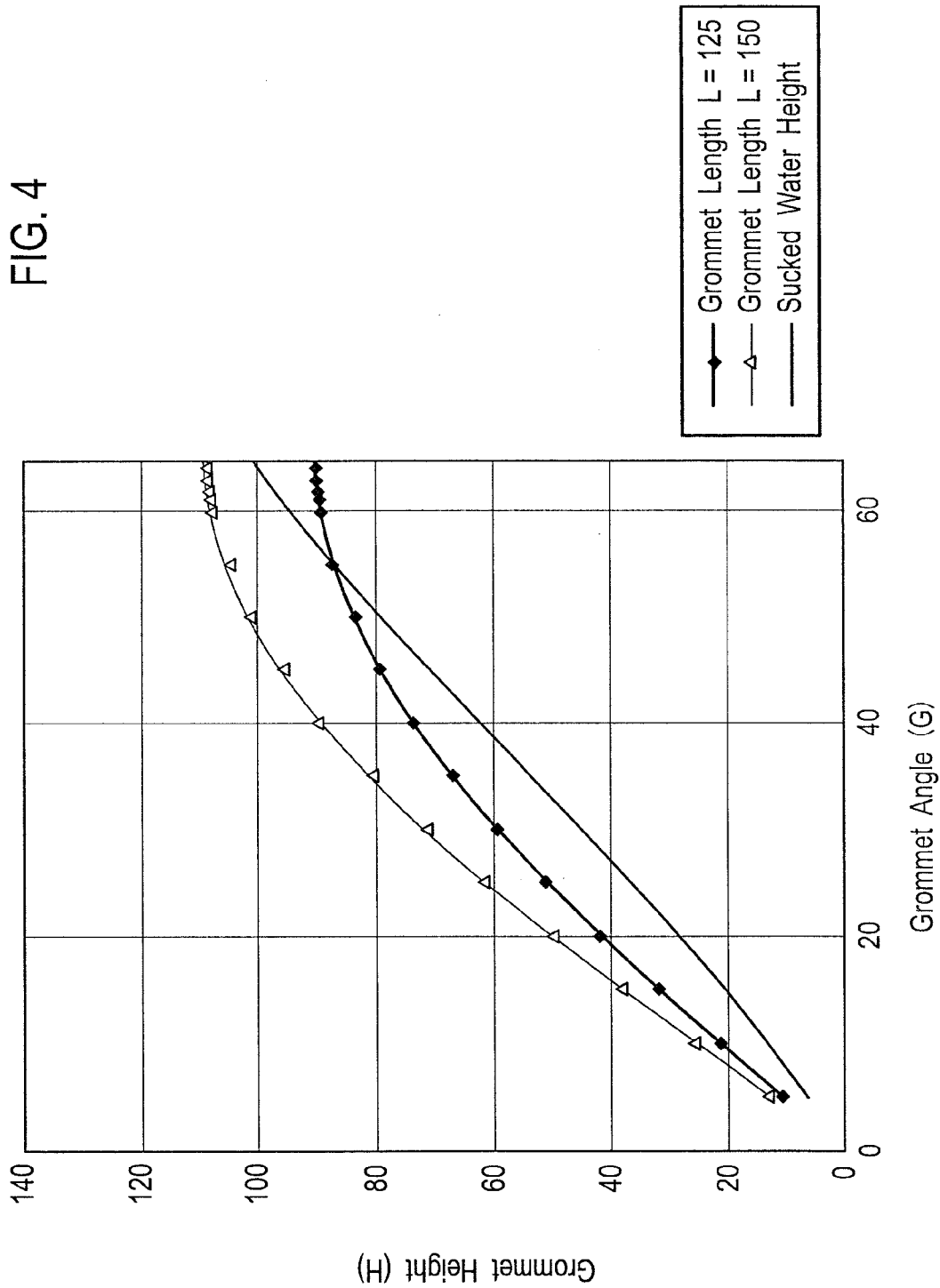
FIG. 4 is a graph showing a height (H) of the grommet 100 [ordinate] relative to a grommet angle G [abscissa].

Next, the grommet length L relative to a sucked water height will be explained using FIG. 4. FIG. 4 is a graph showing a height (H) of the grommet 100 from the lowermost part to uppermost part of the grommet 100 [ordinate] relative to the grommet angle G [abscissa].

In this evaluation, two kinds of samples with different grommet lengths L (125 mm, 150) are prepared, and the sucked water height was evaluated on the same condition.

As a result, as shown in FIG. 4, in the case of the grommet length L of 125 mm, it is obvious that the grommet angle G is preferably from 15 degrees to 55 degrees. On the other hand, in the case of the grommet length L of 150 mm, it is obvious that the grommet angle G is preferably from 15 degrees to 65 degrees or over.

This way, though it can be assumed that the preferable range of the grommet angle G slightly varies depending on the grommet length L, it is obvious that the grommet angle G of 15 degrees to 65 degrees makes it difficult to suck the water. Further, it is assumed that, when the sucked water height is far beyond the grommet length L, the water enters into the grommet 100 to thereby decrease sealability.

(5) Operations and Effects

According to the embodiment set forth above, when the grommet 100 is mounted to the panel 20, the cylindrical portion 110 is arranged on the side of the room inside, and the wire harness W and the cylindrical portion 110 are upwardly inclined. This structure makes it more difficult for the water to enter the grommet 100 than when the wire harness W and the cylindrical portion 110 are in a horizontal state, thus enabling to improve sealability. As a result, the water stopper agent as conventionally shown is not used for improving sealability, thus enabling to improve productivity as well as to reduce production cost.

According to the embodiment, the plurality of wire harnesses W are in a non-bonded state at least in the grommet 100. That is to say, the plurality of wire harnesses W are independent of each other at least in the grommet 100. This structure eliminates the need of bonding the wire harnesses W by a tape or the like, thus enabling to reduce the production cost. In addition, the plurality of wire harnesses W expand (scatter) in the grommet 100, thus enabling to suppress water entry attributable to a capillary phenomenon.

According to the embodiment, the grommet angle G is from 15 degrees to 65 degrees. This range makes it difficult for the water to enter the grommet 100, thus enabling to reliably improve sealability.

(6) Other Embodiments

As set forth above, the contents of the present invention have been disclosed through the embodiment of the present invention. However, it should not be interpreted to mean that the statements and drawings constituting a part of the disclosure limit the present invention. From the above disclosure, various alternative embodiments, examples and operational technologies will be obvious to a person skilled in the art.

For example, the embodiment of the present invention can be changed in the following manner. Specifically, it has been explained that the grommet 100 is to be used for the automobile. However, not limited to this, the grommet 100 may be provided for other vehicles and the like or may be one mounted to a partition and the like through which an electric wire (a long member) is inserted in various industrial instruments, residential houses or the like.

Further, the configuration and structure of the grommet 100 are not limited to those explained according to the embodiment. For example, the grommet 100 may have such a structure as to be mounted to the panel 20 via an inner member provided in the cylindrical portion 120. Further, the cylindrical portion 110 and the cylindrical portion 120 may be provided separately, and forming the cylindrical portion 110 in the form of the long tube is not a must.

Further, it has been explained that the plurality of wire harnesses W are provided and that the plurality of wire harnesses W are in the non-bonded state at least in the grommet 100. However, not limited to the above, it is a matter of course that the harnesses may be bonded with each other by the tape or the like, or even a single wire harness W will do. Further, the above wire harness W may be bent outside the grommet 100 so as to suppress the water entry attributable especially to the capillary phenomenon.

Further, it has been explained that the panel 20 is so provided to be inclined relative to the orthogonal cross line CL. However, not limited to this, the panel 20 may be provided along the orthogonal cross line CL as long as the wire harness W and the cylindrical portion 110 are inclined in the upward direction of the vehicle 1. Further, as long as the wire harness W and the cylindrical portion 110 are inclined in the upward direction of the vehicle 1, the cylindrical portion 110 may be connected in a state of being preliminarily inclined from the cylindrical portion 120.

In this way, it is a matter of course that the present invention may include various embodiments or the like not described herein. Thus, the technical scope of the present invention is defined only by invention-defining matters according to claims which are proper from the above explanation.

What is claimed is:

1. A structure of mounting a grommet to an opening in a partition separating an engine compartment from a passenger compartment, comprising:
    the grommet including:
        a first cylindrical portion for covering at least one wire harness inserted into the opening in the partition, the first cylindrical portion including a structure inclined with respect to the partition; and
        a second cylindrical portion provided at an end portion of the first cylindrical portion and adhered tightly to the partition in such a manner as to cover an edge portion of the opening in the partition,
    wherein, when the grommet is mounted to the partition, the first cylindrical portion is disposed on the side of the passenger compartment, and the structure of the first cylindrical portion is inclined in an upward direction in the passenger compartment to incline the wire harness in the upward direction.

2. The structure of mounting the grommet according to claim 1 wherein,
    a plurality of the wire harnesses are provided, and
    the plurality of the wire harnesses are put in a non-bonded state at least in the grommet.

3. The structure of mounting the grommet according to claim 1 wherein,
    an angle between an imaginary line connecting a center of the second cylindrical portion contacting the partition to a center of a distal end of the first cylindrical portion and a horizontal line is from 15 degrees to 65 degrees.

4. The structure of mounting the grommet according to claim 2 wherein,
    an angle between an imaginary line connecting a center of the second cylindrical portion contacting the partition to a center of a distal end of the first cylindrical portion and a horizontal line is from 15 degrees to 65 degrees.

5. The structure of mounting the grommet according to claim 1, wherein the second cylindrical portion comprises a mating groove.

6. The structure of mounting the grommet according to claim 5, wherein a length from the mating groove to a distal end of the first cylindrical portion ranges from 100 mm to 150 mm.

7. The structure of mounting the grommet according to claim 1, the grommet further comprising a plurality of elastic piece portions configured to deflect when the grommet is being mounted to the partition.

8. The structure of mounting the grommet according to claim 1, wherein the first cylindrical portion comprises a body portion having a first diameter and an end portion having a second diameter smaller than the first diameter of the body portion.

9. A grommet mounting system, the system comprising:
    a partition separating an engine compartment from a passenger compartment, the partition comprising an opening;
    a grommet comprising:
        a first cylindrical portion for covering at least one wire harness inserted into the opening in the partition, the first cylindrical portion including a structure inclined with respect to the partition; and
        a second cylindrical portion provided at an end portion of the first cylindrical portion and adhered tightly to the partition in such a manner as to cover an edge portion of the opening in the partition,
    wherein, when the grommet is mounted to the partition, the first cylindrical portion is disposed on the side of the passenger compartment, and the structure of the first cylindrical portion is inclined in an upward direction on the side of the passenger compartment to incline the wire harness in the upward direction.

* * * * *